March 7, 1933. E. B. BEACHAM Re. 18,757
HOSIERY
Original Filed Nov. 7, 1929
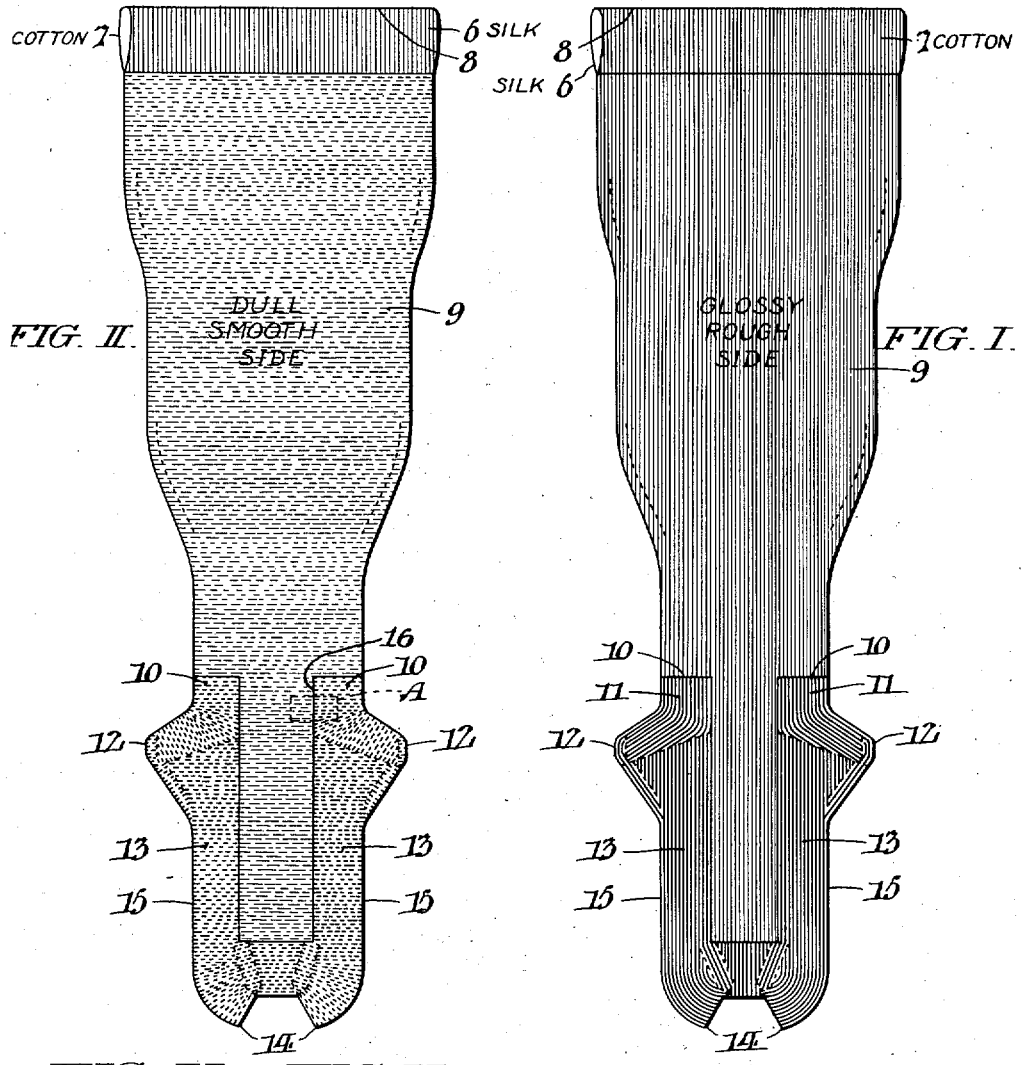
FIG. IV. FIG. V.
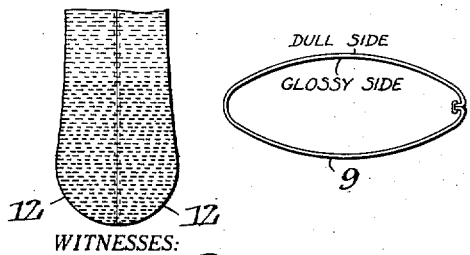
FIG. III.
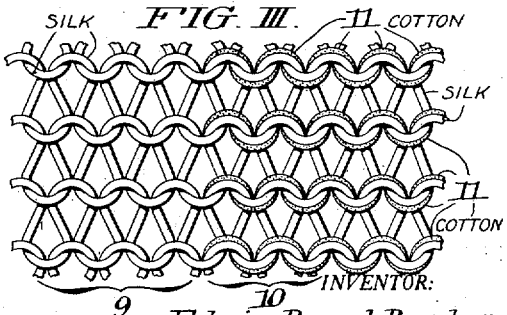
WITNESSES:
John C. Bergner
Hubert Fuchs
INVENTOR:
Edwin Brand Beacham
BY Fraley & Paul
ATTORNEYS.

Reissued Mar. 7, 1933

Re. 18,757

UNITED STATES PATENT OFFICE

EDWIN BRAND BEACHAM, OF EASTON, PENNSYLVANIA, ASSIGNOR TO CHIPMAN KNITTING MILLS, OF EASTON, PENNSYLVANIA, A CORPORATION OF PENNSYLVANIA

HOSIERY

Original No. 1,849,783, dated March 15, 1932, Serial No. 405,545, filed November 7, 1929. Application for reissue filed November 19, 1932. Serial No. 643,329.

This invention relates to hosiery and has reference to stockings of the full fashioned variety knit on flat machines as well as to seamless stockings produced on circular machines.

In plain knit fabrics (as distinguished from rib fabrics) the opposite faces are entirely different in appearance, the one ordinarily known as the "right" side in which the needle wales are prominent, being longitudinally lined or ribbed, and thus somewhat "rough" in appearance, while the opposite or reverse side in which the rounded ends of the fabric loops lay more or less horizontally, is finer in texture and therefore smoother by contrast. In fine gage silk fabrics characteristic of chiffon hosiery such as worn by women at the present time, the difference between opposite faces is even more pronounced, that is to say, the lines or ribs on the rougher right side of the fabric reflect light with a glossy effect, whereas the smooth reverse side of the fabric is comparatively dull. The latter effect enhanced by the delicacy of the texture, is preferred by many since it blends more readily with the skin; and for this reason women may be seen wearing their stockings inside out, notwithstanding exposure of the unsightly ribs of the seams at the rear of the stockings and the backs of the welts (which are usually knit from cotton yarn) as well as of the cotton splicing yarns in the reinforced high heel areas above the shoe tops.

It is to be observed, however, that while the "right" side of ordinary present-day silk stockings has a glossier appearance, and the reverse side looks duller, yet as a matter of fact the reverse really reflects more light than the right side. The peculiar difference seems to be due to the fact that at the reverse side the less exposed threads lie nearer the surface, so the mean plane of the reflecting areas is higher, the surface is smoother and less penetrable to the light, and the ultimate surface area that receives and absorbs light is less,—owing to the smaller depth of the interstices amongst the threads. At the "right" side, on the other hand, the interstitial shadows are deeper, and the contrast between shadows and high lights is more pronounced,—whence the greater glossiness.

The purpose of my invention is to provide an improved method of making stockings whereby the objectionable features to which attention has been directed above are entirely obviated so that the stockings may be worn with the reverse face of the fabric at the outside without any semblance of unsightliness.

In the drawing, Fig. I is a view of a full fashioned stocking blank as knitted in accordance with my invention, showing the glossy, rough "wale" side of the fabric,—which is at the inside of my finished stocking as worn.

Fig. II is a similar reverse view of such a blank, made either in the ordinary way or by split knitting showing the dull, smooth side of the fabric, which is at the outside of my finished stocking as worn,—the line of the junction of the reinforced portions of the foot with the rest representing the suture between the sections reciprocatingly knit in a split foot construction.

Fig. III is an enlarged view of the stocking fabric as worn, with the dull, smooth side outside,—the portion of the fabric shown being that indicated by the dot and dash rectangle "A" in Fig. II,—including cotton reinforcement in the right-hand portion, at the inside.

Fig. IV is a fragmentary view of the finished stocking from behind, as worn, with the seam inside and the dull, smooth side of the fabric outside.

Fig. V is a diagrammatic sectional view of the finished stocking, as worn, with the seam inside.

The procedure in producing full fashioned hosiery on flat knitting machines in accordance with my invention, with use incidentally of cotton yarn to knit that half of the welt which is to be concealed and also to splice the high heel and sole areas, is as follows: At the beginning, a suitable length of welt fabric 6 is knit with a main silk body yarn, and followed by knitting of a corresponding length of fabric 7 with cotton yarn. The welt is then turned at 8 as ordinarily, but with the cotton fabric 7 outermost, as naturally follows from the preceding reversal in the usual order of knitting of the portions 6 and 7. The fashioned leg portion 9 of the stocking blank is next knit with the main silk body yarn down to the point where the high heel portions 10, 10 are to be commenced, when cotton splicing yarns 11 (Figs. I and III are introduced for the purposes of reinforcement during ensuing knitting of the high heel 10, 10 and the heel tabs 12, 12, the feeding of the cotton yarns 11 being however so controlled that the main silk or body yarn is plated over the loops formed by said cotton yarns, i. e., the reinforcing cotton lies at the inside of the stocking when used or worn with the reversed main yarn outermost. In transferring the finished leg blank onto a transfer bar in preparation for transfer to the "footer", the loose threads of the gusset are permitted to remain on the right side of the fabric instead of being thrust between the transfer bar points as ordinarily. The fabric loops now on the point bar are impaled in the known manner upon the needles of the footer in readiness for the knitting of a fashioned foot in direct continuation of the leg blank. Here again the cotton splicing yarn 11 for reinforcing the sole segments 13, 13 and the stocking toe 14 are so fed as to underlie the main silk body yarn on the reverse face of the fabric. In seaming the completed flat profiled stocking blank, the fabric is folded with the reverse smooth, dull face innermost (instead of the right face innermost as usual), the superposed rough selvage edges 15, 15 united by over edge stitching, and the stocking finally turned so that the reverse face of the fabric is on the outside. (Figs. IV and V.)

Thus in full fashioned reverse stockings produced in accordance with my invention, the cotton yarns 11 used to splice or plate the reinforced areas of the high heels 10, 10 and foot soles 13, 13 are entirely obscured, and the ridges of the rear seams at 15, 15 and the cotton backing 7 of the welts 6 concealed, with avoidance of the unsightly aspects of ordinary stockings worn inside out.

A generally similar procedure may obviously be followed in the production of full fashioned hosiery wherein split knitting is resorted to in the fabrication of the reinforced portions of the stockings, the line 16 in Fig. 11 corresponding to the suture between the sections reciprocatingly knit in the split foot stocking.

To produce seamless reverse hosiery in accordance with my invention on circular knitting machines, it is only requisite that the feeding of the splicing yarn be so controlled as to predetermine disposal of the latter beneath the silk on the reverse face of the fabric, and to run up the back seams with the tubular blanks laid flat, right glossy face of the fabric innermost, so that the ridges of the seams are concealed when the stocking is turned, as in the case of the full fashioned hose previously described.

Having thus described my invention, I claim:

1. The method of manufacturing hosiery, intended to be worn with the reverse face of the fabric at the outside, which comprises knitting a stocking blank with a main or body yarn, and incidentally producing reinforced portions with auxiliary yarn fed so that in the fabric as used the loops formed from it underlie those formed from the main yarn on the outwardly exposed reverse face of the fabric.

2. The method of manufacturing hosiery, intended to be worn with the reverse face of the fabric at the outside, which comprises knitting a stocking blank with a main or body yarn, and incidentally producing reinforced portions with splicing yarn incorporated so that in the fabric as used the loops formed from it underlie those formed from the main yarn on the outwardly exposed reverse face of the fabric, and seaming the blank longitudinally of the back so that the ridge of the seam is disposed at the inside of the stocking when the latter is worn as aforesaid.

3. As a new article of manufacture, a stocking with the reverse face of the fabric at the outside and with reinforced portions wherein loops formed from a main or body yarn occupy the outwardly exposed reverse face of the fabric, as used, in superimposition upon the loops formed from an additional or splicing yarn.

4. As a new article of manufacture, a stocking with the reverse face of the fabric at the outside and with reinforced portions wherein loops formed from a main or body yarn occupy the outwardly exposed reverse face of the fabric in superimposition upon the loops formed from an additional or splicing yarn, and with the ridge of a longitudinal seam along the back disposed at the inside of the stocking.

5. A full-fashioned hose blank having a smooth face and a rough face and plated heel tabs, in which the plating is substantially all on the rough face.

6. A stocking having a smooth face and a rough face with reinforced heel portions and a seam presenting a rough selvage, in which the smooth face of the stocking is on the outside and the rough selvage of the seam and the reinforced portions are on the inside of the stocking.

7. In the process of knitting a hose blank having a smooth face and a rough face and plated heel tabs, the step of knitting the leg portion of the blank from the main yarn in substantially the usual way down to the heel tabs, then knitting the plating on the rough face of the blank.

8. In the process of making a full fashioned stocking having a smooth face and a rough face and plated heel tabs, the steps of knitting the leg portion of the blank from the main yarn in substantially the usual way down to the heel tabs, then knitting the plating on the rough face of the blank, then knitted on the foot, and then seaming the stocking blank so that the plated yarn of the heel is on the inside of the stocking.

9. A plated full fashioned stocking having a rough face and a smooth face and a seam presenting a rough selvage, in which the smooth face of the stocking is on the outside and the rough selvage of the seam and the plating are on the inside of the stocking.

10. In the process of making a stocking having a smooth face and a rough face and plated heel tabs, the steps of knitting the leg portion of the blank from the main yarn in substantially the usual way down to the heel tabs, then knitting the plating on the rough face of the blank, and then knitting on the foot.

11. A stocking having a smooth face and a rough face, with a plate portion, and further characterized by having the smooth face of the stocking on the outside, and the plating on the inside.

12. A split foot stocking having a smooth face and a rough face, with a plated portion in its foot, and further characterized by having the smooth face of the stocking on the outside, and the plating of the foot on the inside.

13. A stocking having a smooth face and a rough face, with a reinforced portion in its foot and a seam presenting a rough selvage, in which the smooth face of the stocking is on the outside, and the rough selvage of the seam and the rough face of the reinforced portion of the foot are on the inside of the stocking.

14. A split foot full fashioned stocking having a smooth face and a rough face, with a plated portion in its foot and a seam presenting a rough selvage, and further characterized by having the smooth face of the stocking on the outside, and the rough selvage of the seam and the plating of the foot on the inside.

15. A stocking having a smooth face and a rough face, with a welt including a half knit with auxiliary yarn and a half corresponding to the main portion of the stocking, and with a reinforced portion in the foot; and further characterized by having the smooth face of the stocking on the outside, and the auxiliary yarn half of the welt and the rough face of the reinforced heel portion on the inside.

In testimony whereof, I have hereunto signed my name at Easton, Pa., this 9th day of Nov., 1932.

EDWIN BRAND BEACHAM.